(12) United States Patent
Moss et al.

(10) Patent No.: US 7,947,124 B2
(45) Date of Patent: May 24, 2011

(54) HIGH ELECTRICAL RESISTIVITY INK JET INK COMPOSITION

(75) Inventors: Patrick J. Moss, Wheaton, IL (US); Ayesha Syed, Glendale Heights, IL (US); Terrence A. Renner, Naperville, IL (US)

(73) Assignee: Videojet Technologies Inc.

( * ) Notice: Subject to any disclaimer, the term of this patent is extended or adjusted under 35 U.S.C. 154(b) by 602 days.

(21) Appl. No.: 11/478,868

(22) Filed: Jun. 30, 2006

(65) Prior Publication Data

US 2008/0000385 A1 Jan. 3, 2008

(51) Int. Cl.
C09D 11/02 (2006.01)

(52) U.S. Cl. .............. 106/31.27; 106/31.6; 106/31.58; 106/31.86; 106/31.41; 106/31.72

(58) Field of Classification Search ............... 106/31.27, 106/31.6, 31.58, 31.86, 31.72, 31.41
See application file for complete search history.

(56) References Cited

U.S. PATENT DOCUMENTS

| | | | |
|---|---|---|---|
| 4,024,096 A | 5/1977 | Wachtel | |
| 4,990,186 A * | 2/1991 | Jones et al. | 106/31.37 |
| 5,443,628 A | 8/1995 | Loria et al. | |
| 5,594,044 A * | 1/1997 | Yang | 523/160 |
| 5,663,217 A * | 9/1997 | Kruse | 523/161 |
| 5,693,127 A | 12/1997 | Nigam et al. | |
| 5,800,600 A * | 9/1998 | Lima-Marques et al. | 106/31.29 |
| 5,800,601 A | 9/1998 | Zou et al. | |
| 5,889,083 A | 3/1999 | Zhu | |
| 5,935,308 A * | 8/1999 | Siddiqui et al. | 106/31.14 |
| 6,010,564 A | 1/2000 | Zhu et al. | |
| 6,117,225 A | 9/2000 | Nicolls | |
| 6,133,342 A | 10/2000 | Mizobuchi et al. | |
| 6,140,391 A | 10/2000 | Zou et al. | |
| 6,210,472 B1 | 4/2001 | Kwan et al. | |
| 6,221,933 B1 | 4/2001 | Zhu et al. | |
| 6,235,829 B1 | 5/2001 | Kwan | |
| 6,251,175 B1 | 6/2001 | Zhu et al. | |
| 6,261,348 B1 | 7/2001 | Kwan et al. | |
| 6,372,819 B1 | 4/2002 | Mizobuchi et al. | |
| 6,444,019 B1 | 9/2002 | Zou et al. | |
| 6,478,861 B1 | 11/2002 | Kwan et al. | |
| 6,645,280 B1 | 11/2003 | Zhu et al. | |
| 6,726,756 B1 | 4/2004 | Zou et al. | |
| 6,747,072 B1 | 6/2004 | Siddiqui | |
| 6,908,186 B2 | 6/2005 | Zheng et al. | |
| 6,986,808 B2 | 1/2006 | Fu et al. | |
| 7,025,816 B2 | 4/2006 | Suzuki et al. | |
| 7,041,162 B2 | 5/2006 | Ishizuka et al. | |
| 7,297,201 B2 * | 11/2007 | Looman et al. | 106/31.58 |
| 7,309,388 B2 * | 12/2007 | Zhu et al. | 106/31.4 |
| 2002/0077383 A1 * | 6/2002 | Takao et al. | 523/160 |
| 2003/0058729 A1 * | 3/2003 | Nagata et al. | 365/230.03 |
| 2003/0145761 A1 * | 8/2003 | Redfearn et al. | 106/31.6 |
| 2004/0110868 A1 | 6/2004 | Zhu et al. | |
| 2004/0154495 A1 | 8/2004 | Zhu et al. | |
| 2004/0220298 A1 | 11/2004 | Kozee et al. | |
| 2005/0043438 A1 | 2/2005 | Moore et al. | |
| 2005/0090579 A1 | 4/2005 | Zhu et al. | |
| 2005/0092204 A1 | 5/2005 | Zhu et al. | |
| 2005/0113481 A1 | 5/2005 | Sabys et al. | |
| 2005/0166793 A1 | 8/2005 | Looman et al. | |
| 2005/0248645 A1 * | 11/2005 | Jenkins et al. | 347/105 |
| 2006/0107868 A1 | 5/2006 | Potenza et al. | |

FOREIGN PATENT DOCUMENTS

| | | |
|---|---|---|
| JP | 57-195775 A | 12/1982 |
| JP | 59-074173 A | 4/1984 |
| JP | 10-306221 A | 11/1988 |
| JP | 02-016171 A | 1/1990 |
| JP | 2003-192930 A | 7/2003 |

OTHER PUBLICATIONS

Anna. "Elasto-Capillary Thinning and Breakup of Model Elastic Liquids," *Journal of Rheology*, 45(1): 115-138 (Jan./Feb. 2001).
Bazilevsky et al., "Effects of Polymeric Additives on Vapor Bubble Dynamics in Thermal Ink Jet Printing," *IS&Ts NIP 14: 1998 International Conference on Digital Printing Technologies*, 15-18 (1998).
Evans et al., "Optimisation of Ink Jet Droplet Formation Through Polymer Selection," *IS&Ts NIP 15: 1999 International Conference on Digital Printing Technologies*, 78-81 (1999).
Meyer et al., "Effects of Polymeric Additives on Thermal Ink Jets," *IS&T's NIP 13: 1997 International Conference on Digital Printing Technologies*, 675-680 (1997).
Shield et al., "Drop Formation by DOD Ink-Jet Nozzles: A Comparison of Experiment and Numerical Simulation," *IBM Journal of Research and Development*, 31(1): 96-110 (Jan. 1987).

* cited by examiner

*Primary Examiner* — Jerry Lorengo
*Assistant Examiner* — Veronica Faison Gee
(74) *Attorney, Agent, or Firm* — Joseph A. Yosick

(57) ABSTRACT

Disclosed is an ink jet ink composition having reduced ink buildup on the printer nozzle plate. The ink jet ink composition comprises a non-conductive solvent, one or more binder resins that are soluble in the non-conductive solvent, and a colorant soluble in the non-conductive solvent. Also disclosed is a method of printing on statically charged substrates. The ink jet ink composition provides one or more advantages: reduced ink buildup on the printer nozzle, reduced down time or cleaning time, and improved print quality.

23 Claims, 3 Drawing Sheets

HIGH ELECTRICAL RESISTIVITY INK JET INK COMPOSITION

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed image on that surface.

In general, an ink jet ink composition should meet certain requirements to be useful in ink jet printing operations. These relate to viscosity and resistivity of the ink, the solubility and compatibility of the components, and/or the wettability of the substrate. Further, the ink should be quick drying and smear resistant, and be capable of passing through the ink jet nozzle(s) without clogging, and permit rapid cleanup of the machine components with minimum effort. The printed message or image should also resist abrasion.

When printing in the drop-on-demand mode employing certain ink jet ink compositions on substrates which retain high static electric charges, such as polyethylene and polyvinyl chloride shrink wrap packaging materials, the printer nozzle tends to clog up more frequently than normal. The ink builds up around the nozzle on the nozzle plate. This leads to poor quality images. The printer nozzle requires periodic cleaning, which leads to more frequent printer down time. The foregoing shows that there exists a need for an ink jet ink composition that can provide improved quality images on such substrates. There is also a need to reduce the incidence of ink buildup and printer nozzle clogging.

The invention provides such a composition. The advantages of the invention, as well as additional inventive features, will be apparent from the description of the invention provided herein.

BRIEF SUMMARY OF THE INVENTION

The invention provides an ink jet ink composition having reduced ink buildup on the printer nozzle plate. The invention provides an ink jet ink composition comprising a non-conductive solvent, one or more binder resins that are soluble in the non-conductive solvent, and a colorant soluble in the non-conductive solvent. The invention also provides a method of printing on statically charged substrates. The ink jet ink composition of the invention provides one or more advantages: reduced ink buildup on the printer nozzle, reduced down time or cleaning time, and improved print quality.

BRIEF DESCRIPTION OF THE SEVERAL VIEWS OF THE DRAWING(S)

DETAILED DESCRIPTION OF THE INVENTION

Figure 1:
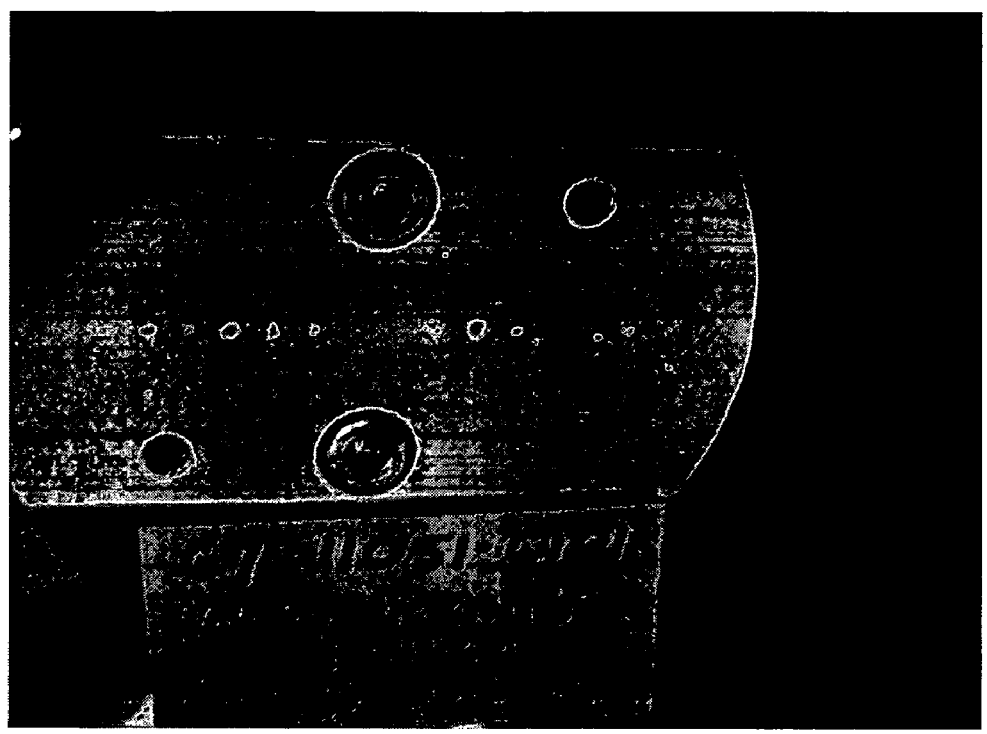
FIG. 1 depicts a photographic image of a printer nozzle plate after 1000 print cycles when an ink jet ink composition in accordance with an embodiment of the invention is printed on a PVC substrate statically charged to 2 kV.

Substrates such as polyethylene and PVC films tend to hold high static electrical charge. This static charge is generated when the substrates unwind from the spool and/or are transported via a conveyor system under the printer nozzle. It is believed, without wishing to be bound by any theory or mechanism, that the static charge, which can be from 0 to greater than 20 kV, e.g., 5-10 kV, or 30-40 kV, tends to distort the ink droplets, for example, elongate the droplet tail, causing the droplet to more easily break up and form what are called "microsatellites", which is a collection of broken droplet tails, around the printer nozzle on the nozzle plate. These microsatellites accumulate on the printer nozzle, thereby reducing print quality and requiring frequent clean up to retain good print quality. Frequent cleaning results in reduced printing time. The present invention provides an ink jet ink composition that reduces microsatellite formation and improves the print quality.

Accordingly, the present invention provides an ink jet ink composition comprising a non-conductive solvent, one or more binder resins that are soluble in the non-conductive solvent, and a colorant soluble in the non-conductive solvent.

Any suitable non-conductive solvent can be used. For example, the non-conductive solvent can be selected from the group consisting of esters, hydrocarbons, halogenated hydrocarbons, ethers, ketones, alcohols, glycol ethers, pyrrolidones, and any combination thereof, particularly a non-conductive ester solvent such as ethyl acetate. The non-conductive solvent has an electrical resistivity of about 4 Mohm-cm or more, preferably about 10 Mohm-cm or more. The non-conductive solvent is preferably free of hydrogen bonding ability. The non-conductive solvent can be present in any suitable amount, e.g., from about 50% to about 90% by weight, preferably from about 70% to about 85% by weight, and more preferably from about 80% to about 83% by weight, of the ink jet ink composition. In an embodiment, the ink jet ink composition is free or substantially free of water, alcohols, or other solvents capable of forming hydrogen bonding.

The ink jet ink composition of the invention contains any suitable colorant, e.g., dye, particularly a nonionic dye, for example, Oil Black 860 or Sudan Black. The colorant can be present in any suitable amount, for example, from about 1% to about 6% by weight, preferably from about 2% to about 5% by weight, and more preferably from about 3% to about 4% by weight, of the ink jet ink composition. In an embodiment, the ink jet ink composition is free or substantially free of ionic dyes, particularly anionic dyes, e.g., anionic $Cr^{+3}$ complex dyes.

The ink jet ink composition of the invention can contain any suitable binder resin, for example, one or more selected from the group consisting of rosin resins, vinyl resins, polyvinylbutyral resins, nitrocellulose, cellulose acetate butyrate, acrylic resins, and any combination thereof. The binder resin is preferably stable to degradation, for example, the resin does not degrade hydrolytically, thermally, or photochemically, or does not release ionic degradation products. In an embodiment, the ink jet ink composition is free or substantially free of nitrocellulose, which is known to degrade and release ionic degradation products. An example of a rosin resin is a rosin ester resin such as STAYBELITE™ Ester 10, which promotes film formation on the printed image, and is available from Hercules, Inc.; an example of a vinyl resin is VMCH™ resin, which is a vinyl chloride/vinyl acetate resin containing acrylic acid monomer units for improving adhesion to substrates, and is available from Union Carbide. The binder resin can be present in any suitable amount, for example, from about 5% to about 25% by weight, preferably from about 10% to about 20% by weight, and more preferably from about 12% to about 15% by weight, of the ink jet ink composition.

The ink jet ink composition of the invention can further include one or more additives, for example, humectants, plasticizers, and wetting agents. The humectant advantageously prevents ink drying out prematurely, for example, during printer idle times. Any suitable humectant can be used, for example, a glycol ether such as tripropylene glycol monomethyl ether or propylene glycol methyl ether. The humectant advantageously keeps the ink drying time short during printing on substrates, which is desirably kept below 10 seconds, preferably below 2 seconds. The humectant can be present in any suitable amount, for example, from about 0.01% to about 5% by weight, preferably from about 0.1% to about 2% by weight, and more preferably from about 0.2% to about 0.5% by weight, of the ink jet ink composition.

The plasticizer advantageously imparts durability to the image and compatibility to the ink composition, and in embodiments, increased shelf life to the ink composition. Any suitable plasticizer can be used, for example, an alkyl benzyl phthalate ester such as butyl benzyl phthalate ester, available as Plasticizer 160 from Ferro. The plasticizer can be present in any suitable amount, e.g., from about 0.1% to about 2.5% by weight, preferably from about 0.5% to about 2% by weight, and more preferably from about 1.0% to about 1.5% by weight, of the ink jet ink composition.

The wetting agent advantageously imparts sphericity to the ink droplet. Any suitable wetting agent can be used, for example, a polyalkylene oxide- (e.g., polyethylene oxide-) modified polydimethylsiloxane, such as SILWET™ L-7622, available from OSi Specialties. The wetting agent can be present in an amount from about 0% to about 2% by weight, preferably from about 0.2% to about 1.5% by weight, and more preferably from about 0.5% to about 0.8% by weight, of the ink jet ink composition.

In an embodiment, the invention provides an ink jet ink composition wherein the non-conductive solvent is present in an amount from about 60% to about 90% by weight, the colorant is present in an amount from about 1% to about 5% by weight, and the binder resin or binder resins are present in an amount from about 10% to about 20% by weight, of the ink jet ink composition.

In any of the embodiments, the ink jet ink composition includes a humectant in an amount up to 1% by weight of the ink jet ink composition. In any of the embodiments, the ink jet ink composition includes a wetting agent in an amount from about 0.1% to about 1.0% by weight of the ink jet ink composition. In any of the embodiments, the ink jet ink composition includes a plasticizer in an amount up to 2% by weight of the ink jet ink composition.

In a particular embodiment, the ink jet ink composition comprises ethyl acetate as the non-conductive solvent, Oil Black 860 as the colorant, and a rosin ester resin and a vinyl resin as the binder resins. In any of the embodiments, the ink jet ink composition includes tripropylene glycol monomethyl ether as the humectant.

The ink jet ink composition of the invention can be prepared by any suitable method, for example, by combining the desired components and mixing them, and optionally milling the mixture and/or filtering to remove undissolved impurities.

The present invention further provides a method for printing ink jet ink images on a substrate comprising ejecting from a plurality of orifices a series of droplets of the ink jet ink composition as described herein to the substrate, controlling the timing of the emitted droplets with respect to the movement of the substrate so that the droplets form an image on the substrate, and allowing the images to dry. In accordance with the invention, the substrate is one which holds static electrical charges, for example, a plastic substrate holding high static electrical surface charge. An example of such plastic substrate is a packaging material, e.g., one that comprises polyvinyl chloride or polyethylene. PVC pipe is another substrate for printing.

The present invention further provides a method for reducing microsatellite formation on the printer nozzle plate during drop-on-demand ink jet printing of images on a substrate having high static electrical charge comprising directing a stream of droplets of any of the ink jet ink compositions described above onto the substrate and controlling the direction of the droplets so as to form an image on the substrate, whereby formation of microsatellite is reduced. The ink jet ink composition of the present invention provides uninterrupted printing up to 1000 print cycles or more at a 2 kV static charge on a PVC substrate. For example, the ink composition in accordance with an embodiment operates for 1000 print cycles at about 18 kV static charge on PVC. A print cycle indicates the time required to print one complete code on the substrate (e.g., one code per second). The ink jet ink composition is suitable for printing on all types of plastics that hold static electric charges, for example, shrink wrap materials, blow molder materials, corrugated paper, film such as biaxially oriented polypropylene, PVC, and frozen food and tobacco product wrappers.

The ink jet ink composition of the invention has an electrical resistivity higher than about 100,000 ohm-cm, preferably higher than 1 Mohm-cm, and more preferably 2 Mohm-cm or higher. The ink jet ink composition of the invention provides higher run time to failure than an ink composition having a resistivity of 1000 ohm-cm. Thus, for example, the run time to failure for an ink having a resistivity of 2 Mohm-cm is increased by 30 hours at a static voltage of 2 kV, by 20 hours at a static voltage of 5 kV, and by 15 hours at a static voltage of 10 kV relative to an ink composition having an electrical resistivity of about 1000 ohm-cm.

The following examples further illustrate the invention but, of course, should not be construed as in any way limiting its scope.

EXAMPLE 1

This example demonstrates embodiments of the ink jet ink composition of the invention. The components described below are combined and mixed to obtain an ink composition which is filtered to remove any undissolved impurities.

| COMPONENT | Weight Percent - Ink (1) | Weight Percent - Ink (2) |
|---|---|---|
| Ethyl Acetate | 83.00 | 81.95 |
| Rosin resin (Staybelite Ester 10) | 9.00 | 10.00 |
| Vinyl resin (VMCH) | 4.25 | 3.30 |
| Oil Black 860 | 3.00 | 3.00 |
| Tripropylene glycol monomethyl ether | 0.25 | 0.25 |
| SILWET L-7622 | 0.50 | 0.50 |
| Plasticizer 160 | 0.00 | 1.00 |
| Total | 100.00 | 100.00 |

EXAMPLE 2

Figure 2:
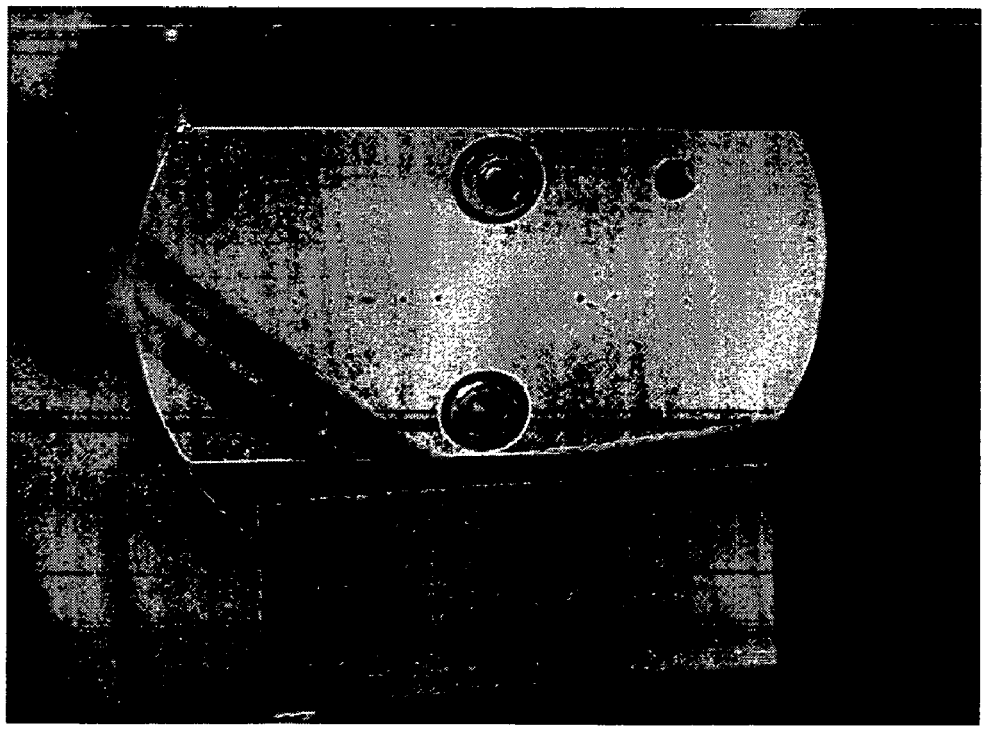
FIG. 2 depicts a photographic image of a printer nozzle plate after 1000 print cycles when an ink jet ink composition in accordance with an embodiment of the invention is printed on a PVC substrate with an ionizer installed to dissipate the static electricity on the substrate before printing.

Ink (1) of Example 1 is tested on PVC film substrates charged statically. A VJ1120 ink jet printer, which is a microvalve printer, is employed. FIGS. 1 and 2 depict photographic images of the printer nozzle plate after 1000 print cycles. In the test leading to FIG. 1, the printer nozzle plate is statically charged to 2 kV; virtually no ink buildup is seen. In the test leading to FIG. 2, an ionizer is installed to dissipate the static electricity on the substrate before printing. FIG. 2 also shows that virtually no ink buildup takes place during this test.

Figure 3:
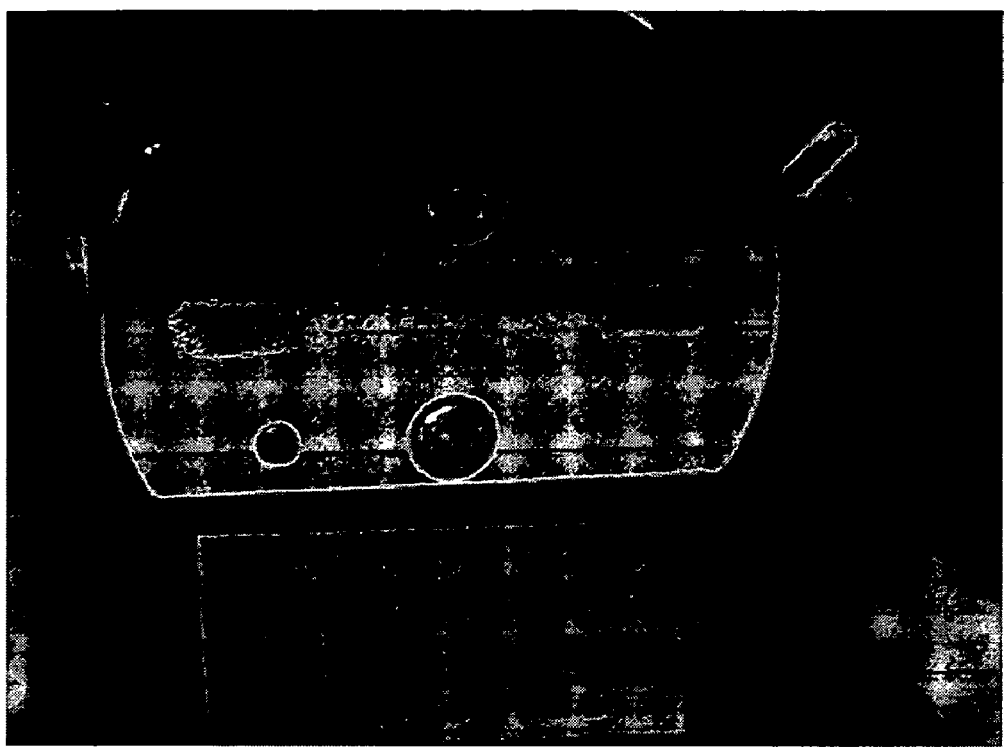
FIG. 3 depicts a photographic image of a printer nozzle plate after 1000 print cycles when an ink jet ink composition in accordance with an embodiment of the invention is printed on a PVC substrate statically charged to 18 kV. The print head is a 16-array print head.
Figure 4:
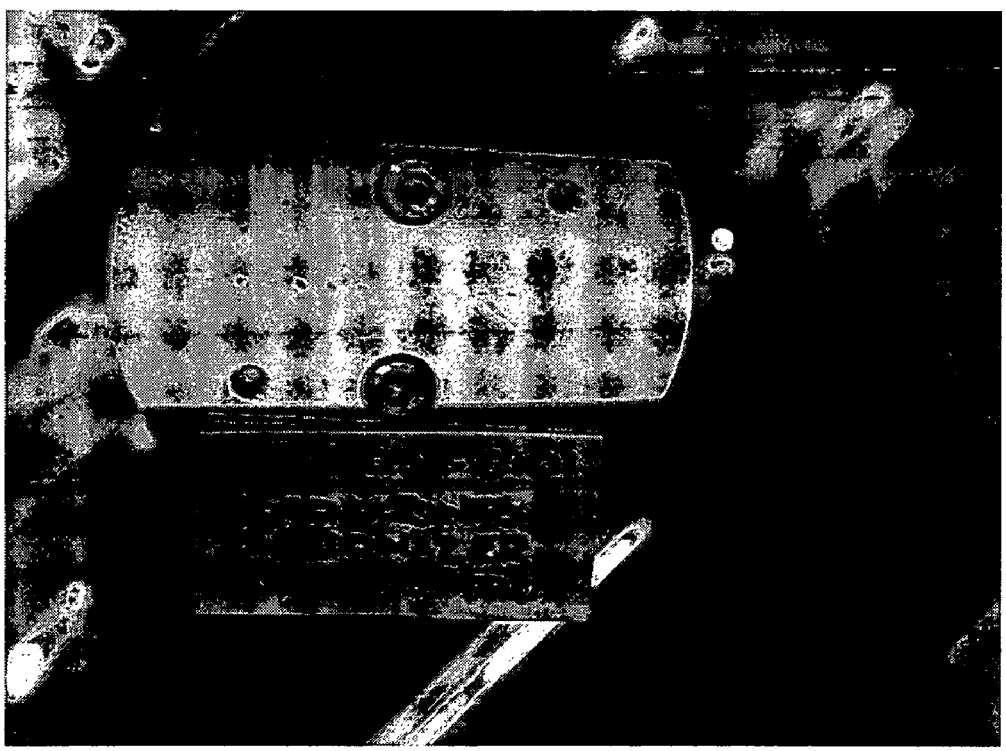
FIG. 4 depicts a photographic image of a printer nozzle plate after 1000 print cycles when an ink jet ink composition in accordance with an embodiment of the invention is printed on a PVC substrate with an ionizer installed.
Figure 5:
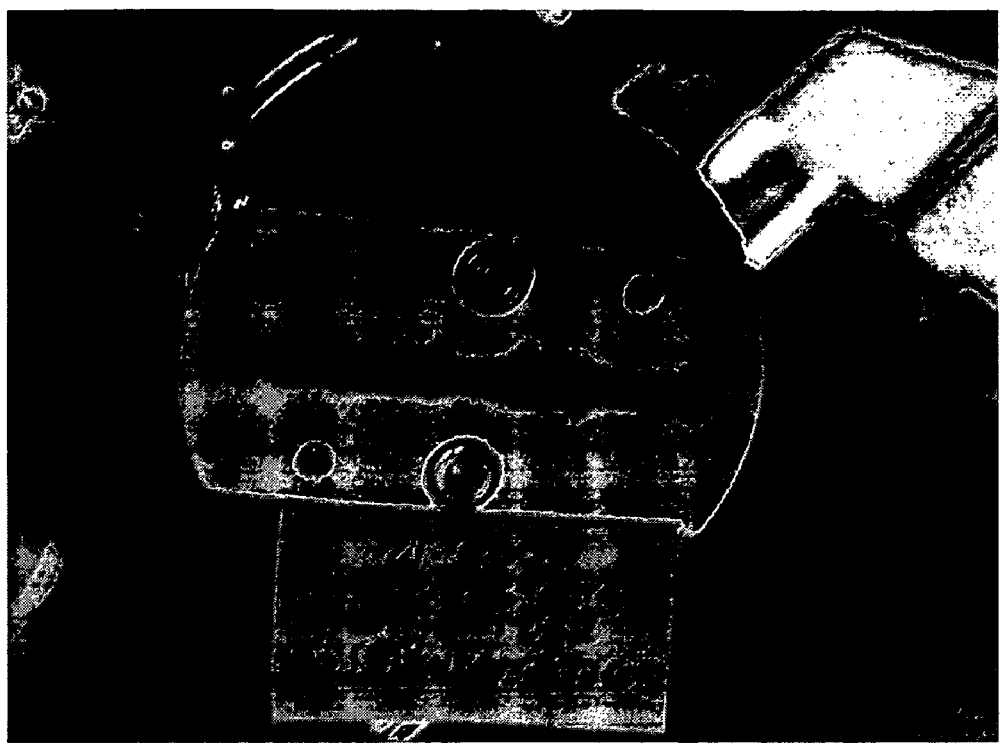
FIG. 5 depicts a photographic image of a printer nozzle plate after 300 print cycles when a prior art ink jet ink composition is printed on a statically charged PVC substrate.
Figure 6:
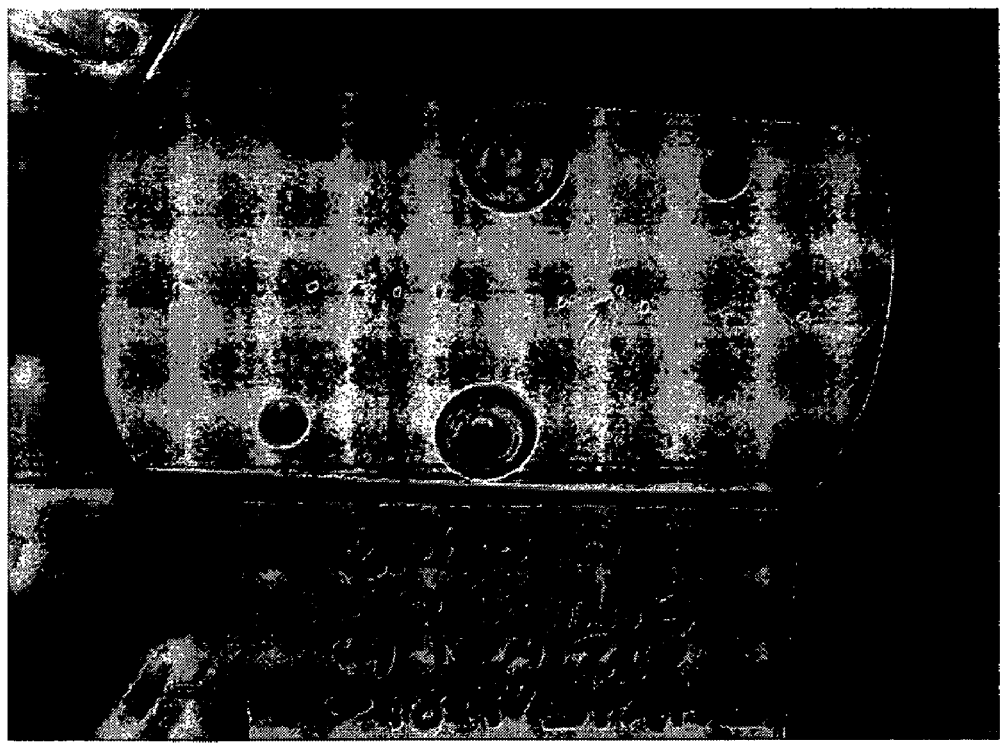
FIG. 6 depicts a photographic image of a printer nozzle plate after 300 print cycles when a low resistivity ink jet ink composition is printed on a PE substrate with an ionizer installed.

FIG. 3 depicts a photographic image of the printer nozzle plate after 1000 print cycles on a PVC substrate statically charged to 18 kV. The print head is a 16-array print head. FIG. 4 depicts a photographic image of the printer nozzle plate after 1000 print cycles on a PVC substrate with an ionizer installed. FIG. 1-4 show that ink compositions of the invention provide superior performance compared to an ink composition of low electrical resistivity, whose photographic images are shown in FIG. 5-6, where significant ink buildup can be seen even after 300 print cycles on a statically charged PVC (FIG. 5) or statically charged PE (FIG. 6) substrate.

The run time to failure is higher for the inventive ink composition than for the ink composition of low electrical resistivity which contains a nitrocellulose binder resin and an anionic dye as the colorant. Failure is deemed to occur when the printed code is no longer legible due to ink buildup on the print head.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An ink jet ink composition comprising a non-conductive solvent; one or more binder resins that are soluble in the non-conductive solvent, wherein the binder resin is selected from the group consisting of rosin ester resins, vinyl resins, polyvinylbutyral resins, cellulose acetate butyrate, acrylic resins, and any combination thereof; and a colorant soluble in the non-conductive solvent, wherein the ink jet composition has an electrical resistivity higher than about 100,000 ohm-cm.

2. The ink jet ink composition of claim 1, wherein the non-conductive solvent is selected from the group consisting of esters, hydrocarbons, halogenated hydrocarbons, ethers, ketones, alcohols, glycol ethers, pyrrolidones, and any combination thereof.

3. The ink jet ink composition of claim 2, wherein the non-conductive solvent is an ester.

4. The ink jet ink composition of claim 3, wherein the ester is ethyl acetate.

5. The ink jet ink composition of claim 1, wherein the colorant is a nonionic dye.

6. The ink jet ink composition of claim 1, further including one or more of humectants, plasticizers, and wetting agents.

7. The ink jet ink composition of claim 6, wherein the humectant is a glycol ether.

8. The ink jet ink composition of claim 7, wherein the glycol ether is tripropylene glycol monomethyl ether or propylene glycol methyl ether.

9. The ink jet ink composition of claim 6, wherein the plasticizer is an alkyl benzyl phthalate ester.

10. The ink jet ink composition of claim 6, wherein the wetting agent is a polyalkyleneoxide-modified polydimethylsiloxane.

11. The ink jet ink composition of claim 1, wherein the non-conductive solvent is present in an amount from about 60% to about 90% by weight, the colorant is present in an amount from about 1% to about 5% by weight, and the binder resin or binder resins are present in an amount from about 10% to about 20% by weight, of the ink jet ink composition.

12. The ink jet ink composition of claim 11, further including a humectant in an amount up to 1% by weight of the ink jet ink composition.

13. The ink jet ink composition of claim 11, further including a wetting agent in an amount from about 0.1% to about 1.0% by weight of the ink jet ink composition.

14. The ink jet ink composition of claim 11, further including a plasticizer in an amount up to 2% by weight of the ink jet ink composition.

15. The ink jet ink composition of claim 1, comprising ethyl acetate as the non-conductive solvent and a rosin resin and a vinyl resin as the binder resins.

16. The ink jet ink composition of claim 15, which further includes tripropylene glycol monomethyl ether as the humectant.

17. A method for printing ink jet ink images on a substrate comprising ejecting from a plurality of orifices a series of droplets of the ink jet ink composition of claim 1 to the substrate, controlling the timing of the emitted droplets with respect to the movement of the substrate so that the droplets form an image on the substrate, and allowing the images to dry.

18. The method of claim 17, wherein the substrate is a plastic substrate holding high static electrical surface charge.

19. The method of claim 18, wherein the plastic substrate is a packaging material.

20. The method of claim 19, wherein the packaging material comprises polyvinyl chloride or polyethylene.

21. A method for reducing microsatellite formation on nozzle plate during drop-on-demand ink jet printing of images on a substrate having high static electrical charge comprising directing a stream of droplets of the ink jet ink composition of claim 1 onto the substrate and controlling the direction of the droplets so as to form an image on the substrate, whereby formation of microsatellite is reduced.

22. The ink jet composition of claim 1 wherein the ink jet composition has an electrical resistivity higher than 1 Mohm-cm.

23. The ink jet composition of claim 1 wherein the ink jet composition is substantially free of nitrocellulose.

\* \* \* \* \*